Patented July 7, 1931

1,813,387

UNITED STATES PATENT OFFICE

GLENN DAVIDSON AND IRVING F. LAUCKS, OF SEATTLE, WASHINGTON

PROCESS OF MAKING A WATER RESISTANT DOUBLE DECOMPOSITION ADHESIVE AND TO THE PRODUCT THEREOF

No Drawing. Application filed January 25, 1929. Serial No. 335,143.

Our invention relates to the process of making a water resistant double decomposition adhesive and to the product thereof. More particularly, our invention relates to the addition of a chemical compound to an adhesive, the base of which adhesive is an oleaginous seed flour, which chemical compound, in the presence of lime, definitely modifies the thickening tendency of such oleaginous seed flour adhesive in the presence of a sulphur derivative of carbonic acid and at the same time acts as a dispersing agent on the oleaginous seed flour.

There are two main classes of adhesives, the bases of which are oleaginous seed flours.

*Class #1.*—Adhesives in which the alkalinity is developed by "double decomposition," which may be termed "ready mixed adhesives."

*Class #2.*—Adhesives in which the alkalinity is supplied directly by addition of caustic soda (or its equivalents—caustic potash or ammonia) as such. For references covering Class #2 see U. S. Letters Patent 1,689,732.

Adhesives in Class #1 are characterized, in general, by possessing a greater degree of water resistance than the adhesives in Class #2. Adhesives in Class #2, in general, have a better consistency and better "time-viscosity behavior" than those in Class #1. By "time viscosity behavior" we mean change or lack of change of viscosity of mixed adhesive with elapse of time.

In the use of both of these classes of adhesives it is desirable to add a substance which has the property of increasing the water resistance of the adhesive. Such a substance, we have found, may be a sulphur derivative of carbonic acid, as for example carbon bisulphide. Such discovery respecting sulphur derivatives of carbonic acid has been patented to us. (See U. S. Letters Patent No. 1,691,661.)

By oleaginous seeds we mean such oil bearing seeds as soya beans, peanuts, cottonseed, linseed, sesame seed, castor beans, sunflower seed, etc.

By oleaginous seed flours we mean the products obtained by fine grinding of the residues remaining in the form of cake or meal after removal of the natural oil content of such seeds in whole or in part, such removal being accomplished by pressure or extraction with solvents or a combination of both methods, and also we include in the term oleaginous seed flour the flour obtained by fine grinding the material of high protein content obtained by extraction of such oleaginous seed residues.

By "double decomposition" we mean the reaction which takes place in aqueous media between alkaline earth hydrates and alkali metal salts such as sodium fluoride, tri-sodium phosphate, sodium carbonate, etc. which reaction results in the development of caustic soda.

By "ready mixed adhesives" we mean those adhesives composed of intimately mixed powdered ingredients which adhesives require no further addition of alkaline or alkalinity producing reagents but only need be stirred with water to develop alkalinity and the resultant dispersion, before being ready for application. Such adhesives require no further additions at point of use than water and an ingredient which has the property of increasing the water resistance of the resultant adhesive, such for example as a sulphur derivative of carbonic acid.

By "consistency" of the adhesive we mean the sum total of the physical properties of the adhesive which affect its action under the plant conditions of the veneer industry and other adhesive using industries, such as readyflowing through pipes, ready-spreading by mechanical spreaders and ready-brushing, penetration into the wood, etc.

Sulphur derivatives of carbonic acid, as for example carbon bisulphide, have the property of thickening some adhesives to a marked degree, particularly of Class #1 above, the "double decomposition" glues in which sodium carbonate, tri-sodium phosphate, sodium silicate or any other alkaline salt excepting sodium fluoride which may be used with lime to produce caustic soda in the wet adhesive. This thickening develops to such an extent that the normal consistency of the adhesive is so changed that it will not handle readily through pipes, will not spread properly and has a shortened "life". By "life" is meant that period between the completion of the mixing of the glue and the time at which the adhesive becomes too thick or too thin to spread properly and loses its adhesive value.

We have discovered that of all of the alkaline salts which can be used with lime to develop caustic soda in double decomposition adhesives, sodium fluoride is the one which can be used with water resistance producing sulphur derivatives of carbonic acid and not only not adversely affect the consistency of such double decomposition adhesive but actually improve the consistency to a degree that it is comparable to the consistency of adhesives of Class #2. Further the dry adhesive strength of the glue is notably greater when sodium fluoride is used than where any other alkaline salt is used in the combinations described.

This action of sodium fluoride is most remarkable and unique in the respects noted. As the result of data obtained by our research and practical experience we believe that the reaction between the sodium fluoride and the lime proceeds at a rate which is exactly right for proper colloidal dispersion of the proteins of the oleaginous seed flour. We also have reason to believe that the sodium fluoride itself or the calcium fluoride formed by the reaction has a definite effect upon the proteins or their reaction products.

We have further discovered by extended experiments that on the basis of the whole composition there are limits to the proportionate amount of sodium fluoride and lime which may be used. If too small an amount of the combination of sodium fluoride and lime is used then insufficient alkalinity is developed with resulting insufficient dispersion of the protein content of the oleaginous seed flour and resultant poor adhesive properties. If too great an amount is used in an adhesive, designed for use in gluing wood veneers for example, the resultant adhesive stains the wood to an extent not permissible in practice. Further the adhesive tends to thin to too great a degree, as the result of hydrolysis, and to penetrate into the wood with resultant poor adhesion. As noted above the use of a sulphur derivative of carbonic acid tends to counteract the thinning tendency to some extent—that is, by using a larger proportion of a sulphur derivative of carbonic acid it is possible to use a larger proportion of sodium fluoride and lime without causing excessive thinning.

We do not desire to limit ourselves to any particular ratio of lime to sodium fluoride because we have discovered that lime (calcium hydrate) may be present in amount less than that required to completely react with the sodium fluoride, leaving an excess of sodium fluoride. It is to be understood that substances of an acid nature are permitted to be present in small quantities and that when such substances are present larger proportions of sodium fluoride are, of course, necessary. The lime may also be present in excess of the amount equivalent to the sodium fluoride up to 20 per cent excess of the amount necessary to react with the sodium fluoride.

We have also found that other alkaline salts may be used in these oleaginous seed protein adhesives, which adhesives are distinguished by comprising the reaction products of sodium fluoride and lime with such protein, in definitely limited amounts without destroying or affecting the beneficial effect of the sodium fluoride above described. For example we may use with the sodium fluoride such salts as phosphates of sodium, sodium carbonate, sodium silicate, sodium sulphite, etc. which react with the lime to supply caustic soda or we may use caustic soda as such.

Our experiments show that the practical limit of the amount of such other alkaline salts is fifty per cent (50%) of the maximum theoretical alkalinity. That is to say, an adhesive of the nature herein described may develop fifty per cent (50%) of the total possible caustic soda from sodium fluoride and lime and the other fifty per cent (50%) from reaction of other alkaline salts and lime or from addition of caustic soda as such, without seriously lessening the beneficial effects derived from the use of the sodium fluoride.

When lesser proportions of sodium fluoride are used, however, the dry adhesive strength of the resultant adhesive is lowered and the consistency is seriously impaired, the thickening tendency of the sulphur derivative of carbonic acid becoming predominant.

We do not restrict ourselves to the ingredients or percentages of ingredients given in the formula herein below set forth since this formula is our preferred formula and is merely an example of a large number which we have used successfully and it is given herein for the purpose of illustration only.

|  |  | Per cent |
|---|---|---|
| (1) | Soya bean flour | 72.5 |
|  | Calcium hydrate | 12.3 |
|  | Rosin (powdered) | 3.9 |
|  | Potassium permanganate | 0.3 |
|  | Sodium fluoride | 11.0 |

These ingredients are thoroughly mixed in the dry state, in the following manner: 1000 parts of soya bean flour, 150 parts of calcium hydrate, 225 parts of powdered rosin, 20 parts of permanganate are mixed together dry, sacked off and allowed to stand for aging purposes for a period of thirty days or longer. Then, 351½ parts of this preliminary dry mix, 800 parts of soya bean flour, 140½ parts of calcium hydrate, 158 parts of sodium fluoride are mixed together dry and sacked off and this mixture comprises the percentage formula given above. Then 250 lbs. of water are placed in a mechanical mixer of suitable type. One hundred (100) lbs. of the above described mixture of dry ingredients are added to the water and the whole stirred well. Then 2 lbs. of carbon bisulphide are added together with 75 lbs. of water and the whole stirred until smooth and free from lumps. The adhesive is now ready for use on wood veneers, blocks, paper, cloth or other substances or combinations of substances.

Other oleaginous seed flours which may be used, as shown by our experiments are peanut flour, sesame flour, castor cake flour, cottonseed flour, corn gluten flour, linseed flour, etc.

Other typical sulphur derivatives of carbonic acid which have been used in the above and other formulæ and with the oleaginous seed flours noted and with sodium fluoride as the sole alkaline salt and in combination with sodium fluoride and other alkaline salts which form caustic soda in the presence of lime in the proportions shown, are for example, xanthates, thiocarbonates, thio-carbanilid, thio-urea, etc.

In further illustration, we give below several formulæ. These formulæ give ingredient proportions of the adhesives when said adhesives are finally mixed and ready for use on plywood or other material to be glued.

| | | Parts |
|---|---|---|
| (2) | Peanut flour | 100 |
| | Calcium hydrate | 30 |
| | Sodium fluoride | 8 |
| | Sodium carbonate | 10 |
| | Sodium thio-carbonate | 10 |
| | Water | 450 |
| (3) | Cottonseed flour | 100 |
| | Sodium fluoride | 8 |
| | Sodium carbonate | 10 |
| | Calcium hydrate | 22 |
| | Boric acid | 3⅓ |
| | Carbon bisulphide | 5 |
| | Water | 367 |
| (4) | Linseed meal | 100 |
| | Calcium hydrate | 27 |
| | Sodium fluoride | 8 |
| | Sodium carbonate | 10 |
| | Carbon bisulphide | 5 |
| | Water | 478 |
| (5) | Soya bean flour | 72.5 |
| | Calcium hydrate | 12.3 |
| | Resin (powdered) | 3.9 |
| | Potassium permanganate | 0.3 |
| | Sodium fluoride | 11.0 |
| | Sodium thio-carbonate | 3.0 |
| | Water | 328.0 |
| (6) | Soya bean flour | 72.5 |
| | Calcium hydrate | 12.3 |
| | Resin (powdered) | 3.9 |
| | Potassium permanganate | 0.3 |
| | Sodium fluoride | 11.0 |
| | Potassium xanthate | 4.0 |
| | Water | 330.0 |
| (7) | Soya bean flour | 72.5 |
| | Calcium hydrate | 12.3 |
| | Resin (powdered) | 3.9 |
| | Potassium permanganate | 0.3 |
| | Sodium fluoride | 11.0 |
| | Thio-carbanilid | 4.0 |
| | Water | 330.0 |
| (8) | Soya bean flour | 72.5 |
| | Calcium hydrate | 12.3 |
| | Resin (powdered) | 3.9 |
| | Potassium permanganate | 0.3 |
| | Sodium fluoride | 11.0 |
| | Copper sulphate | 4.0 |
| | Thio-urea | 2.0 |
| | Water | 328.0 |

In general, it may be said, our invention comprises the discovery that when a sulphur derivative of carbonic acid is to be used as a water resistance producing agent in a double decomposition adhesive, the base of which adhesive is an oleaginous seed flour, then sodium fluoride is the alkaline salt which gives most beneficial results when used with calcium hydrate to develop the desired amount of alkalinity.

Inasmuch as agents added for the purpose of increasing water resistance have in general a tendency to thicken the glue, our discovery of the counteracting tendency of sodium fluoride may be used in general to stabilize the viscosity of a glue which employs an agent for the purpose of increasing water resistance, which agent at the same time tends to thicken the glue.

It will be understood that the adhesive consists of ingredients, a part of which may be mixed together by the adhesive or glue manufacturer from what is called the "dry-mix materials." These materials thoroughly mixed together may be commercially marketed and sold in sacks with directions to add the sodium fluoride in solution in water to dry-mix materials at the time of use of the adhesive. Hence, the adhesive dry-mix materials may be prepared and sold by an adhesive or glue manufacturer while the sodium fluoride in solution in water may be added separately by the user at a subsequent time, that is at the time of use.

We claim:

1. A method of making double decomposition adhesives embodying oleaginous seed flours and sulphur derivatives of carbonic acid which comprises adding thereto sodium fluoride as an alkaline salt which together with calcium hydrate provides the alkalinity required in the presence of water.

2. A method of making double decomposition adhesives embodying soya bean flour and sulphur derivatives of carbonic acid which comprises adding thereto sodium fluoride as an alkaline salt which together with calcium hydrate provides the alkalinity required in the presence of water.

3. A method of making double decomposition adhesives embodying oleaginous seed flours and sulphur derivatives of carbonic acid which comprises adding thereto sodium fluoride in amount which together with calcium hydrate will produce a minimum of (½) one-half of the theoretical total alkalinity in the presence of water.

4. A method of making double decomposition adhesives embodying soya bean flour and sulphur derivatives of carbonic acid which comprises adding thereto sodium fluoride in amount which together with calcium hydrate will produce a minimum of (½) one-half of the theoretical total alkalinity in the presence of water.

5. A method of making double decomposition adhesives embodying oleaginous seed flours and carbon bisulphide which comprises adding thereto sodium fluoride as an alkaline salt which together with calcium hydrate provides the alkalinity required in the presence of water.

6. A method of making double decomposition adhesives embodying soya bean flour and carbon bisulphide which comprises adding thereto sodium fluoride as an alkaline salt which together with calcium hydrate provides the alkalinity required in the presence of water.

7. In the manufacture of a double decomposition oleaginous seed flour adhesive embodying a sulphur derivative of carbonic acid, the step of adding thereto therein sodium fluoride.

8. In the manufacture of a double decomposition soya bean flour adhesive embodying a sulphur derivative of carbonic acid, the step of adding thereto therein sodium fluoride.

9. A double decomposition adhesive embodying an oleaginous seed flour, a sulphur derivative of carbonic acid, calcium hydrate and sodium fluoride.

10. A double decomposition adhesive embodying a soya bean flour, a sulphur derivative of carbonic acid, calcium hydrate and sodium fluoride.

11. A double decomposition adhesive embodying an oleaginous seed flour, carbon bisulphide, calcium hydrate and sodium fluoride.

12. A double decomposition adhesive embodying a soya bean flour, carbon bisulphide, calcium hydrate and sodium fluoride.

13. In an adhesive composition having an oleaginous seed flour base and a sulphur derivative of carbonic acid as a water resistance producing agent, sodium fluoride as the alkalinity developing and as a consistency maintaining agent in conjunction with calcium hydrate in the presence of water.

14. In an adhesive composition having an oleaginous seed flour base and a sulphur derivative of carbonic acid as a water resistance producing agent, calcium hydrate and sodium fluoride with other alkaline salts as the alkalinity developing agents, the sodium fluoride being present in an amount to produce not less than fifty per cent (50%) of the total theoretical alkalinity in the presence of water.

15. In an adhesive composition having an oleaginous seed flour base and a sulphur derivative of carbonic acid as a water resistance producing agent, calcium hydrate and sodium fluoride as the alkalinity developing agents either the hydrate or the sodium fluoride being present in excess of the amount necessary to react with the other, the lime when in excess not exceeding twenty per cent (20%) of such amount.

16. In an adhesive composition having a soya bean flour base and a sulphur derivative of carbonic acid as a water resistance producing agent, sodium fluoride as the alkalinity developing and as a consistency maintaining agent in conjunction with calcium hydrate in the presence of water.

17. In an adhesive composition having a soya bean flour base and a sulphur derivative of carbonic acid as a water resistance producing agent, calcium hydrate and sodium fluoride with other alkaline salts as the alkalinity developing agents, the sodium fluoride being present in an amount to produce not less than fifty per cent (50%) of the total theoretical alkalinity in the presence of water.

18. In an adhesive composition having an oleaginous seed flour base and carbon bisulphide as a water resistance producing agent, sodium fluoride as the alkalinity developing and as a consistency maintaining agent in conjunction with calcium hydrate in the presence of water.

19. In an adhesive composition having an oleaginous seed flour base and carbon bisulphide as a water resistance producing agent, calcium hydrate and sodium fluoride with other alkaline salts as the alkalinity developing agents, the sodium fluoride being present in an amount to produce not less than fifty per cent (50%) of the total theoretical alkalinity in the presence of water.

20. In an adhesive composition having a soya bean flour base and carbon bisulphide as a water resistance producing agent, sodium fluoride as the alkalinity developing and as a consistency maintaining agent in conjunction with calcium hydrate in the presence of water.

In witness whereof we hereunto subscribe our names this 14th day of January, 1929.

GLENN DAVIDSON.
IRVING F. LAUCKS.